O. C. GRAFF.
FENDER.
APPLICATION FILED FEB. 23, 1910.
967,900.
Patented Aug. 23, 1910.
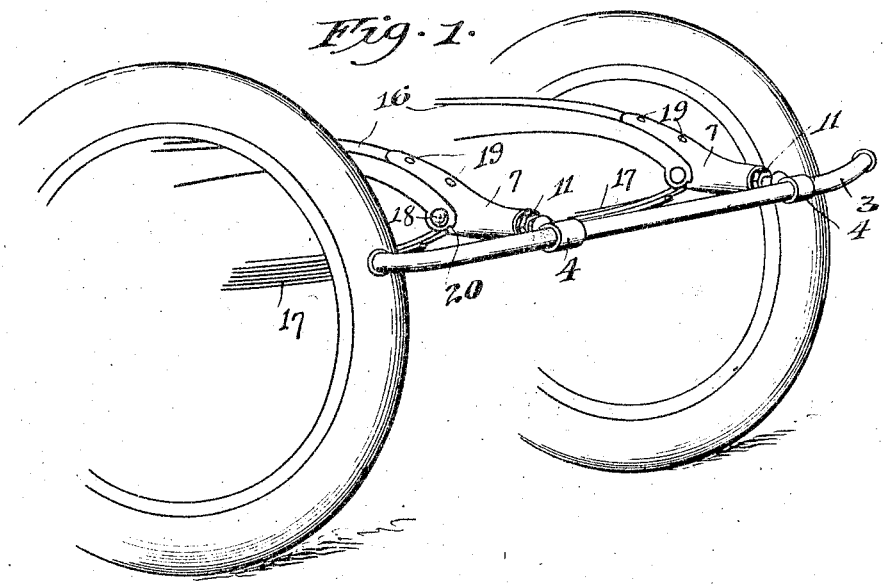
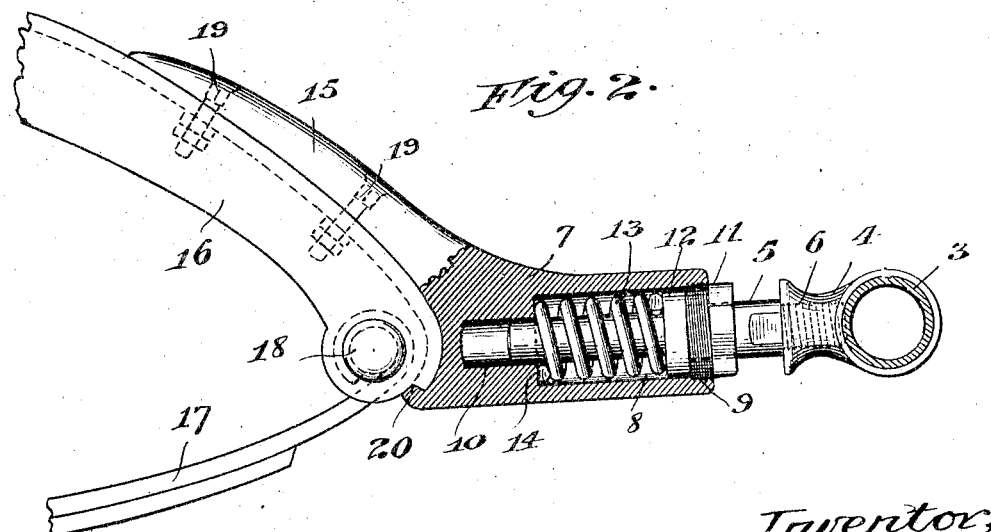
Witnesses
J. S. Mann
M. E. Adams
Inventor,
Oscar C. Graff.
By Offield, Towle, Graves & Offield
Attys.

UNITED STATES PATENT OFFICE.

OSCAR C. GRAFF, OF CHICAGO, ILLINOIS, ASSIGNOR TO C. P. KIMBALL & CO., OF CHICAGO, ILLINOIS, A CORPORATION OF ILLINOIS.

FENDER.

967,900.

Specification of Letters Patent. Patented Aug. 23, 1910.

Application filed February 23, 1910. Serial No. 545,333.

*To all whom it may concern:*

Be it known that I, OSCAR C. GRAFF, a citizen of the United States, residing at Chicago, in the county of Cook and State of Illinois, have invented certain new and useful Improvements in Fenders, of which the following is a specification.

The invention relates in general to fenders adapted to be used for all purposes for which fenders are used, but more particularly for motor vehicles.

Fenders for motor vehicles have heretofore consisted of a suitable rail or guard, a supporting rod for said rail, spring cushioning means, and a guide for the supporting rod; such guide being connected to some point upon the vehicle, the point of attachment being generally to the end of the vehicle frame by means of a bolt, or to the spring of the vehicle. Constructions of this character are faulty on account of the weak support for the guide, and for the further reason that the line of thrust upon the supporting rod is to one side of the main support for such supporting rod.

To overcome the foregoing objections, I have devised a fender adapted to be connected to a vehicle frame or other support, whereby the thrust comes directly upon the strong support, such as the vehicle frame.

The object, therefore, of my invention is to provide a simple and compact fender, neat in appearance, yet extremely durable.

A further object of my invention is to provide a fender whereby the shocks from collisions will be imparted directly to the strongest point of attachment, with not only less injury to the parts of the fender itself, but also with less liability of injury to the vehicle frame or other point of attachment.

To these ends the invention consists of a suitable rail, a supporting member therefor, a guide for said supporting member, cushioning means, and an extended bearing surface on said guide adapted to be rigidly attached to a vehicle frame or other point of attachment, whereby the shocks from collisions are imparted directly to the point of attachment.

In the accompanying drawings, Figure 1 is a perspective view of my improved fender, attached to a vehicle frame. Fig. 2 is a side elevational view of my improved fender, a part thereof being shown in section.

Referring now more specifically to the drawing, the fender comprises a suitable rail 4, adapted to extend substantially across the vehicle, and preferably supported at two points. Suitable sleeves 4 are mounted upon the rail, to which the supporting members 5 are connected; the ends of the supporting members being suitably threaded, as shown at 6, and adapted to engage threaded apertures in the sleeves 4. Guides 7, the exterior surfaces of which may be of any suitable form, are provided with suitable apertures or bores 8, the outer ends of the bores being suitably threaded, as shown at 9, and the inner ends of the bores 8 being provided with suitable recesses 10 in which the ends of the supporting members 5 are adapted to slide. Threaded nuts 11, having a threaded engagement with the threaded ends 9 of the guides 7, are suitably apertured to receive the supporting members 5, whereby the supporting members have a sliding engagement therewith.

Annular shoulders 12 are rigidly secured to the supporting members 5, serving two purposes, viz; to limit the outward movement of the supporting members and also to compress the cushioning members 13 within the bore 8; the cushioning members 13 being confined between the annular shoulders 12 and the shoulders 14 formed integral with the guides 7. The guides 7 are provided with extended bearing surfaces 15 which may be of any suitable form, but which are herein shown as having curved surfaces conforming to the curved upper surfaces of the frames 16 to which the springs 17 are attached by means of the bolts 18. The extended bearing surfaces 15 of the guides 7 are connected to the vehicle frame by means of suitable bolts 19.

In the construction as herein described, two guides are provided for supporting the rail 3, one guide being attached to each of the side frames 16 of the vehicle. In Fig. 2 a lip 20 is shown as formed integral with the guide and engaging the ends of the frames 16, but the precise construction of the extended portion of the guide as herein shown is immaterial, for the reason that the end construction of the frames of motor vehicles varies and consequently the precise construction of the guides and extended portions may be varied to have surfaces to conform to the surface of the point of attachment to the vehicle or other supporting member.

In operation, in the event that the rail comes in contact with another device, the rail is moved inwardly toward its support, thereby compressing the cushioning members 13 and the shock of the collision is imparted to the guides which in turn impart the same directly to the strong point of attachment, viz; the vehicle frame.

In the preferred form of construction and particularly when the fender is applied to a motor vehicle, two points of support for the rail are desirable, but it is of course obvious that the invention might be put to certain uses where only one point of support is desired.

It is furthermore obvious that there may be minor changes from the construction herein shown, without departing from the spirit of the invention, and therefore, without confining myself to the precise details of construction,—I claim:

1. In a vehicle fender the combination of a rail, two supporting rods connected at their ends to said rail, guides wherein said rods are slidably supported, said guides being adapted to be secured to the ends of the side frames of a vehicle and having a bearing portion adapted to overlie the frame ends, and springs within said guides and backing said supporting rods.

2. In a vehicle fender the combination of a rail, two supporting rods connected at their ends to said rail, guides having recesses wherein said rods are slidingly supported, curved bearing portions formed integral with said guides and adapted to overlie the ends of the side frame and to be secured thereto, and springs within said recesses and backing said supporting rods.

3. In a vehicle fender the combination of a rail, two supporting rods connected at their ends to said rail, guides having integral bearing portions adapted to abut against the ends of the frame of said vehicle and be secured thereto, recesses within said guides each having one end open and its other end closed and forming a slot in which the free ends of said supporting rods are adapted to slide, springs within said recesses, shoulders on said supporting rods and nuts having a threaded engagement with the threaded ends of said guides and in which nuts said supporting rods are slidably mounted.

OSCAR C. GRAFF.

Witnesses:
JAMES R. OFFIELD,
CHARLES J. SCHMIDT.